United States Patent [19]

Ushiki et al.

[11] Patent Number: 4,958,151
[45] Date of Patent: Sep. 18, 1990

[54] DISPLAY CONTROL CIRCUIT

[75] Inventors: Hiroshi Ushiki, Yokohama; Tetsuaki Iwasaki, Tokyo, both of Japan

[73] Assignees: Kabushiki Kaisha Toshiba, Kawasaki; Tosbac Computer System Company Limited, Tokyo, both of Japan

[21] Appl. No.: 770,171

[22] Filed: Aug. 28, 1985

[30] Foreign Application Priority Data

Sep. 25, 1984 [JP] Japan .................................. 59-200081

[51] Int. Cl.⁵ ............................................. G09G 3/36
[52] U.S. Cl. ...................................... 340/784; 340/811
[58] Field of Search ............... 340/784, 811, 765, 813, 340/814

[56] References Cited

U.S. PATENT DOCUMENTS 3,818,484  6/1974  Nakamura et al. .................. 340/811
3,962,571  6/1976  Brantingham ....................... 340/814
3,973,254  8/1976  Nomiya et al. ..................... 340/811
4,441,106  4/1984  Jackson .............................. 340/811

Primary Examiner—Marshall M. Curtis
Attorney, Agent, or Firm—Schwartz, Jeffery, Schwaab, Mack, Blumenthal & Evans

[57] ABSTRACT

In an integrated circuit for arithmetic operation and display control connected to a power source (46) and a liquid crystal display device (45), and energized by the power source, including an arithmetic operation circuit (42) for performing a designated arithmetic operation, wherein the result of the arithmetic operation is displayed by the display device, a boosting circuit (43) receives and boosts the voltage from the power source (46), a drive circuit (44) is powered by the boosting circuit (43) to drive the liquid crystal display device (45), and a control circuit (41) causes interruption of the driving of the display device when the arithmetic operation circuit (42) is carrying out the arithmetic operation.

5 Claims, 5 Drawing Sheets

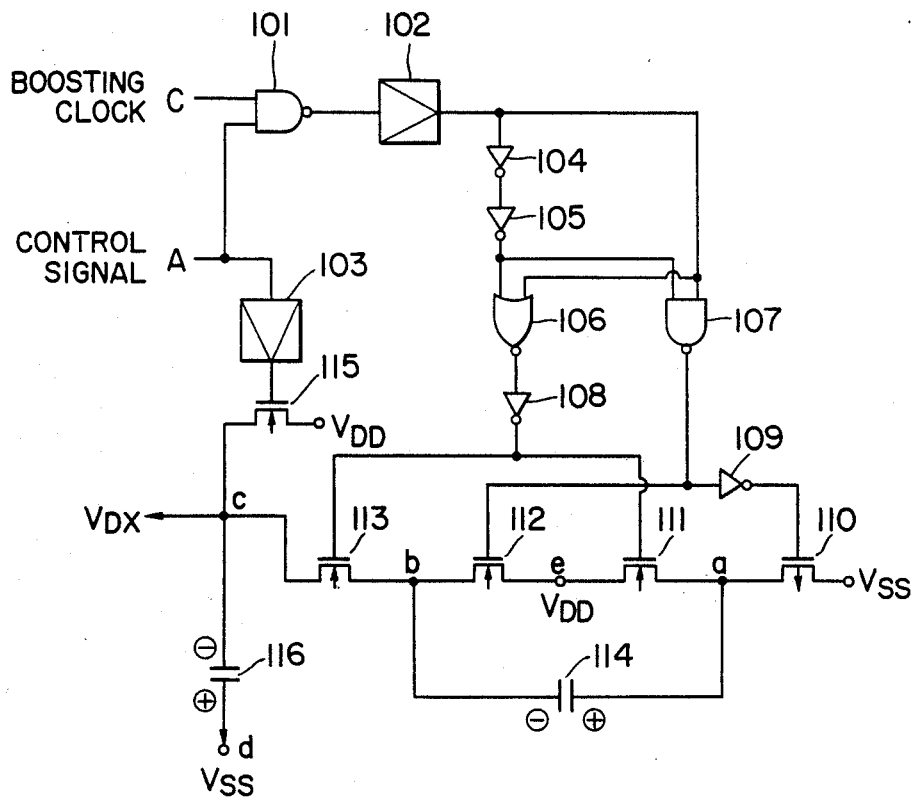
F I G. 3

DISPLAY CONTROL CIRCUIT

BACKGROUND OF THE INVENTION

The present invention relates to an integrated circuit for arithmetic operation and display and more particularly, to such an integrated circuit for use in a small-sized electronic calculator having small power consumption and powered by a solar battery.

With the development of the semiconductor technology, the power consumption of an integrated circuit is made smaller and smaller, and a solar battery is increasingly used as the power source. Small-sized electronic calculators and the like often employ a liquid crystal display device, which usually requires a voltage of 3.0 V to be driven. The voltage supplied by a solar bettery is, on the other hand, typically about 1.5 V. A boosting circuit is therefore necessary to boost the 1.5 V voltage to 3.0 V to drive the liquid crystal display device.

Conventionally, the boosting circuit and the liquid crystal display drive circuit are kept operating without regard to whether or not the arithmetic operation circuit is carrying out the arithmetic operation. Although the display is "off" or disappears, it does not mean that the operation of the drive circuit is interrupted but it means that the drive circuit is giving a turn-off command to all the segments. The total current which flows during the arithmetic operation of the LSI (large scale integration) is the sum of the current required for the arithmetic operation and the current for producing a command for turnoff, and is greater than the total current which flows when the arithmetic operation is not carried out, and which therefore consists of the drive current alone.

FIG. 1 shows a consumption current characteristic of a typical LSI and an output characteristic of a solar battery. The consumption current characteristic curve consists of plots of the consumption current against the power source voltage. As was mentioned, the current during arithmetic operation is greater than the current during display (arithmetic operation being not carried out). The solar battery output characteristic curves consist of voltage-current characteristics with the illuminance as a parameter. For the illuminance of 50 lux, the operating point is at A when the LSI is displaying, so that the voltage supplied to the LSI is about 1.5 V. When, on the other hand, the LSI is carrying out the arithmetic operation, the operating point is at B, so that the voltage supplied to the LSI is about 1.1 V. Operating voltage of the LSI's is typically 1.2–3.0 V. As a result, the voltage supplied to the LSI during arithmetic operation when the illuminance is at 50 lux is outside of the operating range. This may cause an error in the arithmetic operation. The problem is more serious with an LSI which is intended for scientific calculation requiring a longer time for the arithmetic operation, and which therefore has a greater difference in the consumption current and hence in the voltage during display and during arithmetic operation. A conventional measure to solve the problem is to design a solar battery to have a sufficient cell area and hence a sufficient output capacity to provide a sufficient voltage even during arithmetic operation. But increasing the cell area inevitably increases the cost and becomes an obstacle to reduction in size of the product.

SUMMARY OF THE INVENTION

An object of the invention is to reduce the difference in the voltage during display and during arithmetic operation and thereby to prevent an error in the arithmetic operation.

Another object of the invention is to provide an integrated circuit for arithmetic operation and display with which the difference between the power consumption during display and the power consumption during arithmetic operation is small.

An integrated circuit for arithmetic operation and display according to the present invention, is characterized by comprising an arithmetic operation circuit for performing an arithmetic operation, a boosting circuit for producing a boosted voltage, a liquid crystal display drive circuit for driving a liquid crystal display device and a control circuit causing interruption of operation of the boosting circuit and/or the drive circuit during arithmetic operation, whereby the power consumption during arithmetic operation is reduced and hence the difference between the power consumption during arithmetic operation and the power consumption during display is reduced.

BRIEF DESCRIPTION OF THE DRAWINGS

In the accompanying drawings:

FIG. 3 is a circuit diagram showing an example of a boosting circuit 43;

DETAILED DESCRIPTION OF THE PREFERRED EMBODIMENTS

Figure 1:
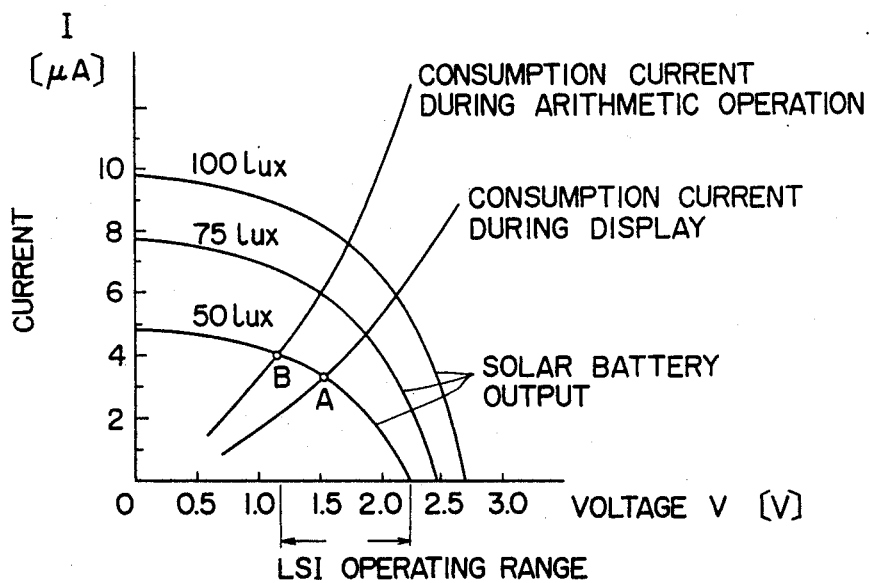
FIG. 1 is a graph showing a consumption current characteristic of a typical LSI and an output characteristic of a solar battery.
Figure 2:
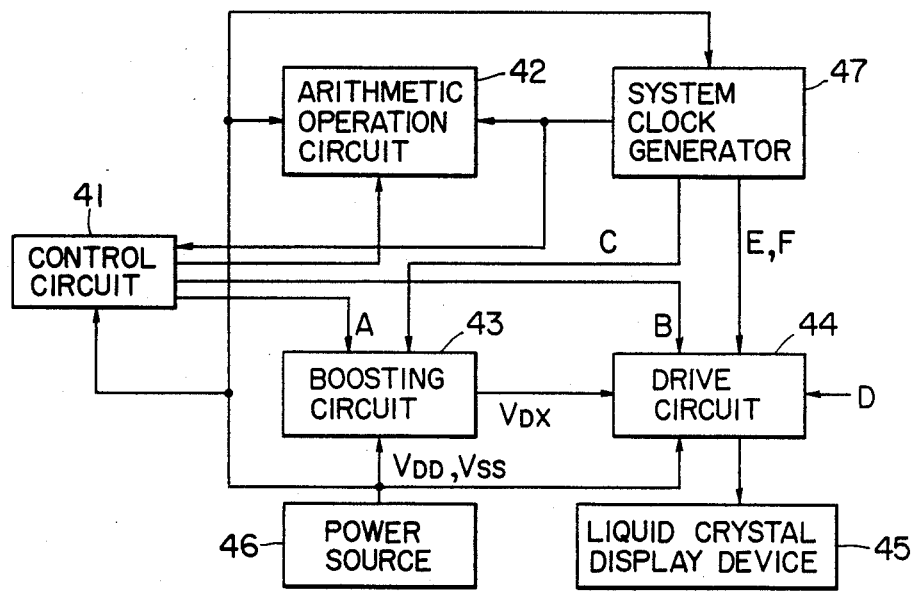
FIG. 2 is a block diagram showing an embodiment of an integrated circuit according to the invention.

FIG. 2 shows an embodiment of an integrated circuit according to the invention. The integrated circuit of this embodiment is for use in a small-sized calculater and comprises an arithmetic operation circuit 42 for performing various numerical calculation, a boosting circuit 43, a liquid crystal display drive circuit 44 and a control circuit 41 controlling the arithmetic operation circuit 42, the boosting circuit 43 and the drive circuit 44. The drive circuit 44 drives a liquid crystal display device (hereinafter referred to as LCD) device 45 to accomplish a required display.

The control circuit 41 produces a control signal A which is at logic "1" during display and is at logic "0" during arithmetic operation.

The boosting circuit 43 receives the control signal A and boosts to double a power source voltage $V_{DD}$ from a power source 46 to produce a voltage $2V_{DD}$ when the signal A is at "1". When the signal A is at "0" the boosting circuit 43 does not carry out the boosting operation so that it produces $V_{DD}$. The output $V_{DX}$ is either $2V_{DD}$ (during display) or $V_{DD}$ (during arithmetic operation).

The drive circuit 44 receives a control signal B from the control circuit 41 and produces a drive output of a waveform (described later) suitable for driving the LCD 45, using the boosted voltage $2V_{DD}$ from the boosting circuit 43, when the signal B is at "1" representing display period. When the signal B is at "0" representing arithmetic operation period, the drive circuit 44 produces an output having a value $V_{SS}=0$ so as not to drive the LCD 45.

A system clock generator 47 generates clock signals used for the operation of the various circuits.

FIG. 3 shows a specific example of the boosting circuit 43. As illustrated, it comprises a NAND gate 101 to which a boosting clock C from the system clock generator 47 and the control signal A from the control circuit 41 are applied. The output of the NAND gate 101 is applied to a positive, i.e., non-inverting type, level shifter 102 which is connected to receive the control signal A. The level shifter shifts the potential level from $V_{DD}$, $V_{SS}$ to $2V_{DD}$, $V_{SS}$. More specifically, when the potential level at the input of the level shifter is $V_{DD}$ (a negative value), the potential level at the output is $2V_{DD}$ (a negative value). When the input is at $V_{SS}=0$, the output is at $V_{SS}=0$. The logic circuits connected to the output of the level shifter 102 operate at this shifted level. The output of the level shifter 102 is fed through inverters 104 and 105 to one of the inputs of a NOR gate 106 and a NAND gate 107. The output of the level shifter 102 is also applied directly to the other inputs of the NOR gate 106 and the NAND gate 107. The inverters 104 and 105 form a delay circuit to prevent simultaneous conduction of two groups of MOSFET's 110–113 later described. The output of the NOR gate 106 is fed through an inverter 108 to the gates of the N-channel MOSFET's 111 and 113. The output of the NAND gate 107 is fed to the gate of the N-channel MOSFET 112 and fed through an inverter 109 to the gate of the P-channel MOSFET 110. The MOSFET's 110–113 are series connected across the power source line $V_{SS}=0$ and a node c. The node e connecting the MOSFET's 111 and 112 is connected to the power source line $V_{DD}$ from the power source 46 which may comprise a solar battery. Connected across a node a connecting the MOSFET's 110 and 111 and a node b connecting the MOSFET's 112 and 113 is a capacitor 114. An output of a positive type level shifter 103 is fed to the gate of a MOSFET 115, which is connected across the power source line $V_{DD}$ and the node c. A capacitor 116 is connected across the node c and a terminal d which in turn is connected to the power source line $V_{SS}$.

Figure 4:
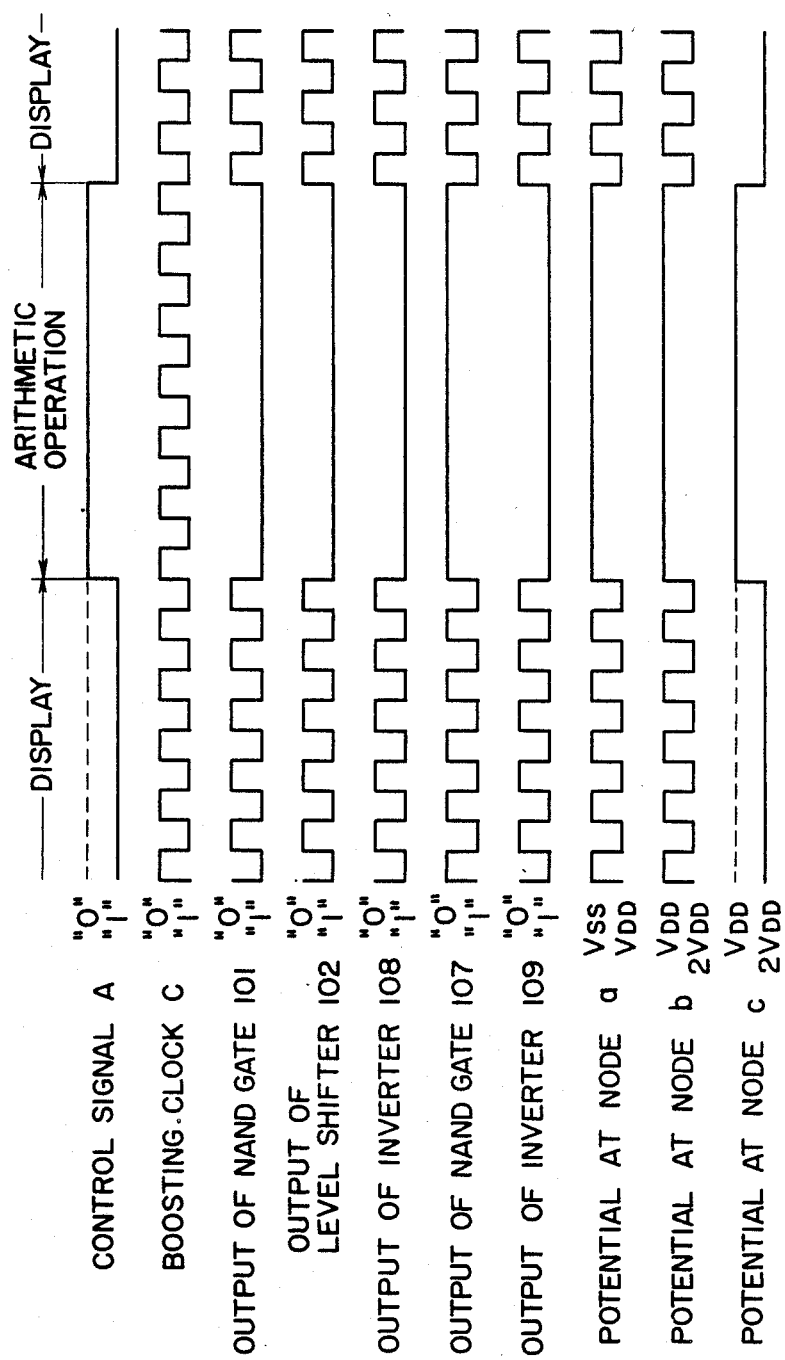
FIG. 4 is a time chart showing operation of the boosting circuit 43.

FIG. 4 shows the operation of the boosting circuit of FIG. 3. The logic is assumed to be a negative logic. The control signal A is at logic "1" during display, and is at logic "0" during arithmetic operation. The boosting clock C consists of a chain of periodically repeated pulses. A chain of repeated pulses therefore appear at the output of the NAND gate only during display. The level shifter 102 is a positive type so that the logic level of its output is identical to the logic level of the output of the NAND gate 101. The logic circuits 104–107 are provided to prevent simultaneous conduction of the two groups of MOSFET's. If the time delay by the inverters 104 and 105 is neglected, the outputs of the NOR gate 106 and NAND gate 107 are inversions of the output of the level shifter 102, and the outputs of the inventers 108 and 109 are inversions of the outputs of the NOR gate 106 and the NAND gate 107.

Let us consider the potentials of the nodes a, b and c during display. When the output of the NAND gate 107 is at "0", the output of the inverter 108 is at "1", so that the P-channel MOSFET 110 and the N-channel MOSFET 112 are ON while the N-channel MOSFET's 111 and 113 are OFF. The node a is therefore connected to $V_{SS}=0$, and the node b is connected to $V_{DD}$. If the capacitance of the capacitor 114 is represented by C, an electric charge $Q=C|V_{DD}-V_{SS}|=C|V_{DD}|$ is accumulated.

When the output of the NAND gate 107 is at "1", the output of the inverter 108 is at "0", so that the MOSFET's 110 and 112 are OFF while the MOSFET's 111 and 113 are ON. Therefore, the node a is connected to $V_{DD}$ and the node b is connected to the node c. As a result, the potential at the node b becomes $2V_{DD}$.

In this way the potential at the node b during display changes periodically and assumes alternately $V_{DD}$ and $2V_{DD}$. The capacitor 116 is charged and the potential at the node c is maintained at $2V_{DD}$.

Let us now consider the potential at the nodes a, b and c during arithmetic operation. The MOSFET's 110 and 112 are kept ON and the MOSFET's 111 and 113 are kept OFF. The potential of the node a is kept at $V_{SS}=0$ while the potential of the node b is kept at $V_{DD}$. The control signal A becomes "0", so that the MOSFET 115 becomes ON and the potential of the node c is kept at $V_{DD}$.

Thus the boosting circuit produces at the node c a voltage of $2V_{DD}$ during display and a voltage of $V_{DD}$ during arithmetic operation. In other words, the boosting circuit carries out the boosting operation only during display. The output voltage at the node c is represented by $V_{DX}(=2V_{DD}$ or $V_{DD})$.

Figure 5:
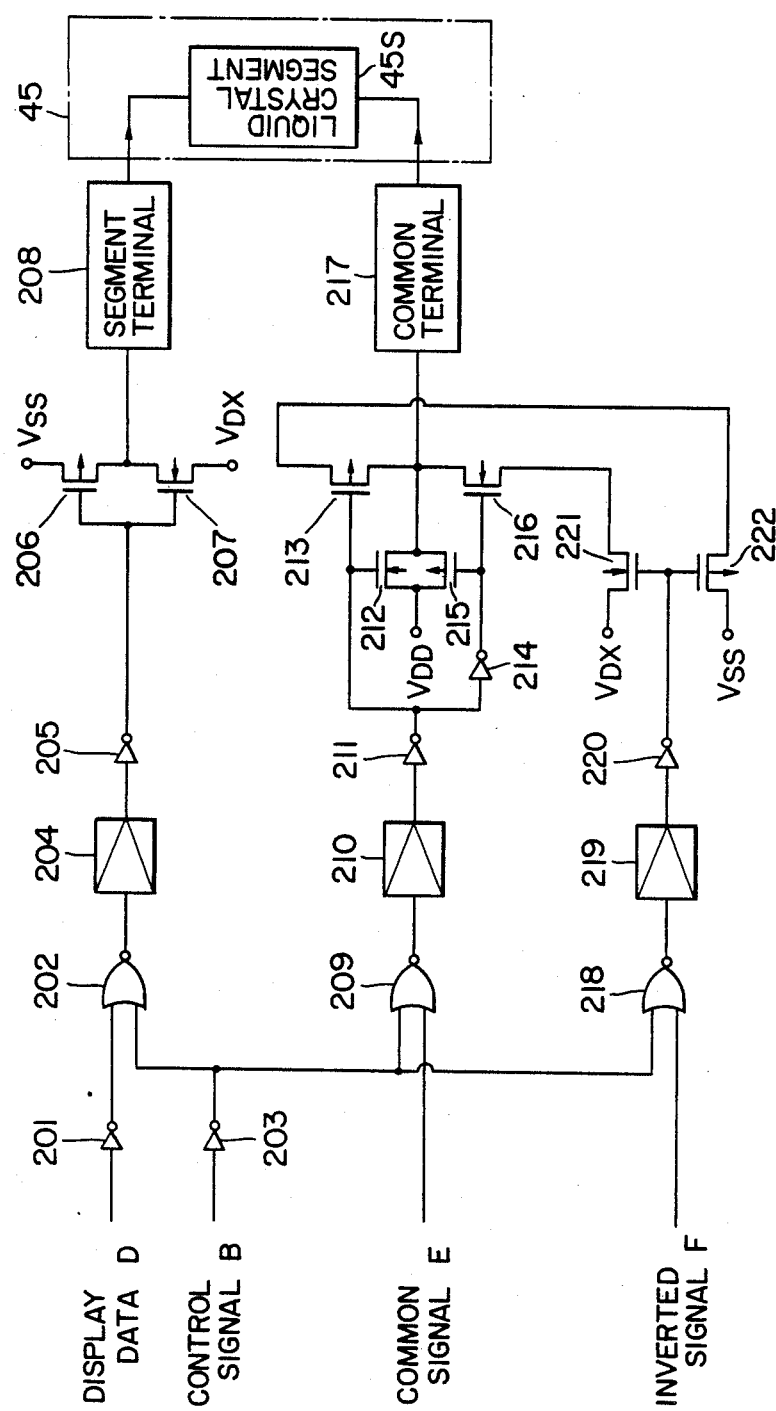
FIG. 5 is a circuit diagram showing an example of a drive circuit 44.

An example of the drive circuit 44 is shown in FIG. 5. Display data D is fed through an inverter 201 to one input of a NOR gate 202. The control signal B, which is at "1" during display and is at "0" during arithmetic operation, is fed through an inverter 203 to the other input of a NOR gate 202. The output of the NOR gate 202 is fed throgh a positive type level shifter 204 and an inverter 205 to the gates of a P-channel MOSFET 206 and an N-channel MOSFET 207. The source of the MOSFET 206 is connected to the power source line $V_{SS}$, while the source of the MOSFET 207 is connected to receive $V_{DX}(=2V_{DD}$ or $V_{DD})$ from the node c of the boosting circuit 43. The drains of the MOSFET's 206 and 207 are connected to the segment terminal 208.

The common signal E is fed to a NOR gate 209. The control signal B is fed through an inverter 203 to the NOR gate 209. The output of the NOR gate 209 is fed through a positive type level shifter 210 and an inverter 211 to the gates of an N-channel MOSFET 212 and a P-channel MOSFET 213, and further through an inverter 214 to the gates of a P-channel MOSFET 215 and an N-channel MOSFET 216. One ends of the MOSFET's 212 and 215 are connected to the power source line $V_{DD}$, while the other ends of them are connected to the common terminal 217. The drain of the MOSFET 216 and the drain of the MOSFET 213 are connected to the common terminal 217. The inverted signal F is fed to a NOR gate 218. The control signal B is also fed through an inverter 203 to the NOR gate 218. The output of the NOR gate 218 is fed through a positive type level shifter 219 and an inverter 220 to the gates of an N-channel MOSFET 221 and a P-channel MOSFET 222. The source of the MOSFET 221 is connected to the power source line $V_{DX}$ from the boosting circuit 43. The drain of the MOSFET 221 is connected to the source of the MOSFET 216. The source of the MOSFET 222 is connected to the power source line $V_{SS}=0$. The drain of the MOSFET 222 is connected to the source of the MOSFET 213. The positive type level shifters have the same function as was described with reference to FIG. 3, i.e., they produce a signal assuming a level of either $V_{SS}=0$ or $2V_{DD}$. Liquid crystal segments 45S (only one of them being shown) of the liquid crystal display device 45 are connected across the respective segment terminals 208 and the common terminal 217.

Figure 6:
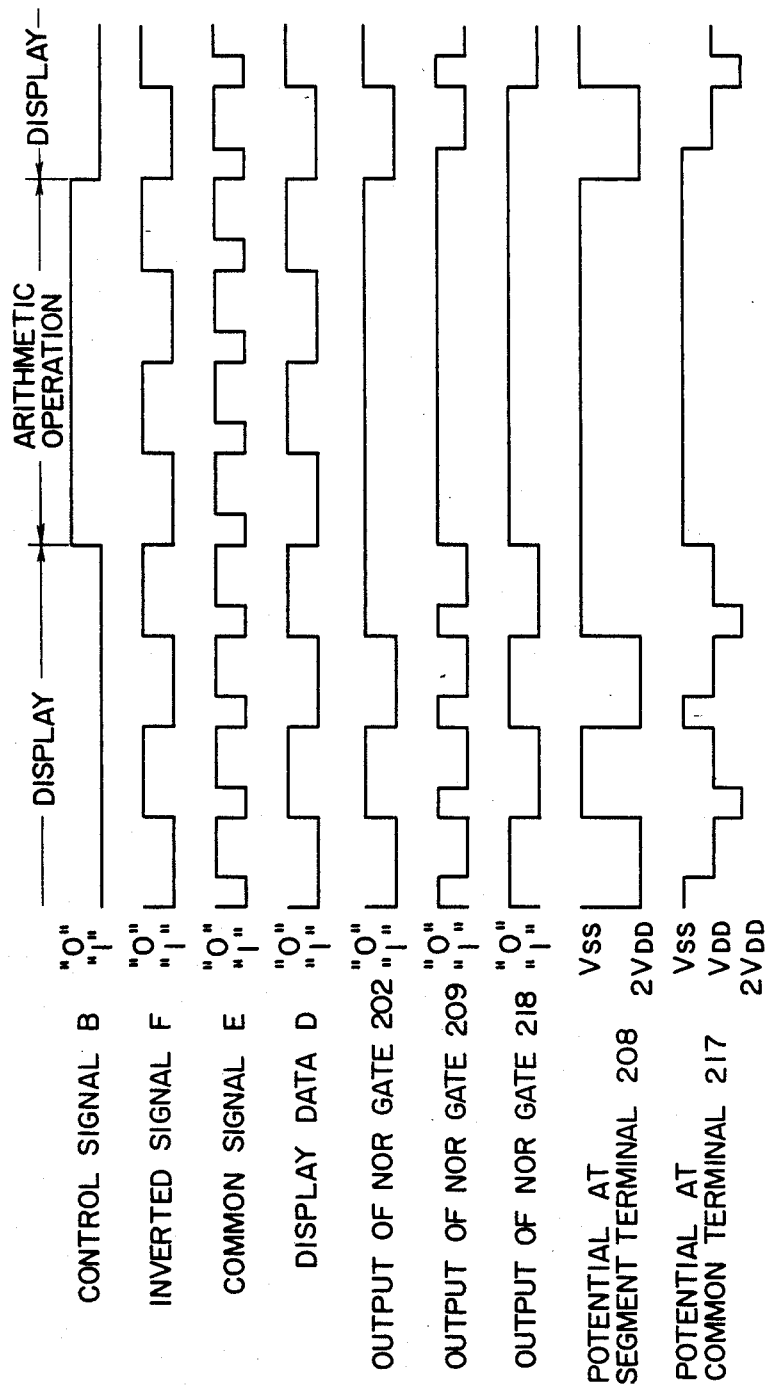
FIG. 6 is a time chart showing operation of the drive circuit 44.

FIG. 6 shows the operation of the drive circuit shown in FIG. 5. The logic is assumed to be a negative logic. The control signal B is at "1" during display and at "0" during arithmetic operation. The inverted signal F and the common signal E assume alternately and periodically a value of "0" and a value of "1". The display data D alternately assumes "0" and "1" depending on whether the corresponding segment should be turned on or off. The signal of the display data illustrated in FIG. 6 is one for turning on the segment. The signal for turning off the segment is a phase inversion of the illustrated signal. The display data D, the common signal E, the inverted signal F are logically combined with the control signal B at the NOR gates 202, 209 and 218, respectively.

Let us now consider the potential at the segment terminal 208 and the common terminal 217 during display. The potential of the segment terminal 208 assumes alternately and periodically a value of $V_{SS}=0$ and a value of $2V_{DD}$. In synchronism therewith, the potential at the common terminal 217 assumes alternately and periodically $V_{SS}$, $V_{DD}$ and $2V_{DD}$. As a result, the potential difference between the segment terminal 208 and the common terminal 217 periodically becomes $|2V_{DD}-V_{SS}|=|2V_{DD}|$, and the corresponding segment of the LCD device is thereby turned on.

On the other hand, the output of the NOR gates 202, 209 and 218 during arithmetic operation becomes "0" because the control signal B is at "0", so that the potentials at the segment terminal 208 and the common terminal 217 are kept at $V_{SS}$. Thus, the LCD device is not driven at all during arithmetic operation.

In the embodiment described, operation of both of the boosting circuit and the drive circuit is interrupted during arithmetic operation. But, alternatively operation of only one of them may be interrupted. The interruption of operation of the boosting circuit inevitably leads to interruption of driving of the display device. "Causing interruption of driving of the display device" as recited in the appended claims should therefore be construed to cover both causing interruption of operation of the boosting circuit as well as causing interruption of operation of the drive circuit.

In the embodiment described, there are provided separate control signals A and B. But a single signal may be used to serve as both of the signals A and B.

As has been described, according to the present invention, the operation of the boosting circuit and/or the drive circuit is interrupted during arithmetic operation, so that the power consumption during arithmetic operation is reduced, and the difference between the power consumption during display and the power consumption during arithmetic operation is reduced. As a result, the difference between the voltages applied to the arithmetic operation circuit during display and during arithmetic operation is reduced and error in the arithmetic operation due to the voltage decrease can be avoided. Moreover, the size of the solar battery can be reduced.

What is claimed is:

1. A display control circuit for reducing power consumption comprising:
   an arithmetic operation circuit for performing a designated arithmetic operation;
   a liquid crystal display device;
   a drive circuit responsive to results of said arithmetic operation for driving said liquid crystal display device;
   a boosting circuit receiving a voltage from a power source, boosting said voltage and supplying the boosted voltage to said drive circuit; and
   a control circuit controlling said arithmetic operation circuit and causing interruption of the operation of the boosting circuit during the period in which said arithmetic operation circuit is carrying out the arithmetic operation,
   whereby said control circuit reduces power consumption during the period of said arithmetic operation.

2. The circuit of claim 1, wherein said boosting circuit comprises:
   a first capacitor accumulating an electric charge across a first terminal and a second terminal;
   a second capacitor accumulating an electric charge across a third terminal and a fourth terminal, with said fourth terminal being connected to a first power source line;
   a first and a second MOSFET respectively connecting the first terminal to the first power source line and the second terminal to a second power source line, the first and the second MOSFET's forming a first group of MOSFET's;
   a third and a fourth MOSFET respectively connecting the first terminal to the second power source line and the second terminal to the third terminal, the third and the fourth MOSFET's forming a second group of MOSFET's; and
   a fifth MOSFET connecting the third terminal to the second power source line;
   said control circuit causing, when the arithmetic operation circuit is not carrying out the arithmetic operation, the fifth MOSFET to be OFF and said first group of MOSFET's and said second group of MOSFET's to be ON and OFF alternately to produce a boosted voltage at the third terminal, and causing, when the arithmetic operation circuit is carrying out the arithmetic operation, the fifth MOSFET to be ON to interrupt the boosting operation.

3. The circuit of claim 2, wherein said control circuit causes, when the arithmetic operation circuit is carrying out the arithmetic operation, the first group of MOSFET's to be ON, and the second group of MOSFET's to be OFF.

4. A display control circuit for reducing power consumption comprising:
   an arithmetic operation circuit for performing a designated arithmetic operation;
   a liquid crystal display device;
   a drive circuit responsive to results of said arithmetic operation for driving said liquid crystal display device;
   a boosting circuit receiving a voltage from a power source, boosting said voltage and supplying the boosted voltage to said drive circuit; and
   a control circuit controlling said arithmetic operation circuit and causing interruption of the operation of the boosting circuit and the drive circuit during the period in which said arithmetic operation circuit is carrying out the arithmetic operation;

whereby said control circuit reduces power consumption during the period of said arithmetic operation.

5. The circuit of claim 1, wherein said liquid crystal display device comprises a plurality of liquid crystal segments, segment terminals for the respective liquid crystal display segments, and a common terminal, and said control circuit causes, when the arithmetic operation circuit is not carrying out the arithmetic operation, the potential at said segment terminals to periodically change to turn on or turn off the liquid crystal display segments connected between the segment terminals and the common terminal, and causes, when the arithmetic operation circuit is carrying out the arithmetic operation, the potentials at the common terminal and the segment terminals to be maintained identical with each other and at a predetermined value.

* * * * *